United States Patent Office 3,491,022
Patented Jan. 20, 1970

3,491,022
INFRASONIC ACTIVATION OF DESALINATION MEMBRANES
Walter Huff, 3361 Craigend, West Vancouver,
British Columbia, Canada
No Drawing. Filed Dec. 27, 1967, Ser. No. 693,705
Int. Cl. B01d 35/22, 13/00
U.S. Cl. 210—19            2 Claims

ABSTRACT OF THE DISCLOSURE

Process of separating solvents from solutions, such as the desalination of sea water, by reverse osmosis. A cell or housing is provided with a solution chamber separated from a solvent chamber by a semipermeable membrane. Pressure exceeding the natural osmotic pressure is applied to the solution side of the cell in order to force solvent from the solution side through the membrane into the solvent chamber. Solute is left behind in the solution chamber. In order to increase the flow of solvent from the solution chamber through the membrane to the purer solvent side, low or infra frequency sound energy is applied to the membrane.

Background of invention

The invention relates the relatively well-known principle of a seimpermeable membrane in a reverse osmosis cell coupled with the less well-known low frequency or infra sound vibrations in the desalination of sea water or the extraction of fresh water from various contaminated sources.

At the present time there are several methods of separating pure water from salt water. Such known processes are distillation, freezing, electrodialysis and reverse osmosis or molecular ultra filtration. Of these methods, distillation is the most commercially significant. Because reverse osmosis requires no change of phase, as in evaporation or ice crystallization separation, it can be operated at high thermodynamic efficiency so that it is economically competitive with processes such as distillation.

Investigation has shown that there are limitations in the reverse osmotic processes now known and shown in prior art. Primarily, these limitations involve clogging of the membrane by salt deposition and short productive life of the membranes due to the development of small leaks. Leaks are serious since even a minute rupture in a membrane can contaminate large amounts of purified products. It has been found that what has been termed "cavitation" at the surface of the membrane increases the flow of water through a semi-permeable membrane thereby facilitating the separation of pure water from salt water. The basis of U.S. Patent No. 3,206,397 is the application of high frequency vibration in combination with reverse osmosis to effect separation of fresh water from salt water. According to said patent, application of the high frequency vibration produces "cavitation" and prevents clogging of the membrane thus substantially increasing the flow of water through the membrane material.

In any process using reverse osmosis for salt water conversion, the selection of the membrane material is extremely important if not critical. In order to withstand the severe requirements and destructive effects of the high pressures, and high frequency vibrations if employed, the membranes must be made of a strong film substance such as polyethylene and other cross-linked polymers. Even then it is desirable if not necessary that the membranes be reinforced with glass fiber or powdered metal. High frequency sound energy applied to the membrane of a reverse osmosis cell tends to make the process uneconomical from the standpoint of shortened membrane life expectancy. Another drawback of high frequency sound energy is a noise factor which can be extremely annoying if the vibrations are in the audible range.

Summary

The invention herein as directed to the application of low frequency and infra sound to reverse osmosis cells for desalination of sea water whereby vibrations of the membrane or membranes greatly increase the through-put of pure water. The low frequency sound wave emitter is external to the desalination cell.

Accordingly, it is among the many features of this invention to provide a new and approved method of producing compressions and rarefactions at the surface of a semipermeable membrane being used in demineralization of saline waters, including sea water, and in the separation of various chemicals where a solute must be separated from a solution. Another feature of this invention is to provide inaudible or unobjectionably audible driving forces or vibrations for use in reverse osmotic processes. Still another feature of the invention is the provision of driving forces or enegy to a semipermeable membrane wherein the low frequency sound waves are produced externally of the reverse osmosis cell thereby eliminating complex and costly internal equipment. Yet another feature is to provide a process for increasing the capacity of a reverse osmosis desalination cell which is uniquely simple and yet adds very little cost to operation of a reverse osmosis desalination cell.

These and other objects, features and advantages will become apparent from the following description and appended claims.

Description of preferred embodiments

Original studies of the phenomena of low and/or infrasonic activation of reverse osmosis membranes were made with respect to the growth of sea plants in active surf conditions along the sea coast. Investigations of the mechanisms used by kelp plants to extract specific minerals from sea water led to a study of their membrane processes and the driving forces utilized by these algae to effect the separations. It became apparent that certain species of kelp grew best in strong surf conditions despite the fact that nutrients in the sea water were present in the same quantities in more quiet waters where bottom conditions favorable for hold-fast attachment were identical to those of the strong surf areas. A study of these surf conditions disclosed the fact that very low frequency sound vibrations of large intensity were generated in areas of high wave shock. Subsequently a program of research into the effect of low frequency sound on membrane mechanism was initiated.

Sound is made up of vibrations with various properties. All sounds, for example, have a frequency which is usually expressed in the number of vibrations per second. The human ear can detect sounds if they are within the range of about 16 cycles per second up to about 20,000 cycles per second. Such frequency range is classified as the audible sound range. Sounds with a frequency over 20,000 cycles per second normally cannot be heard by the human ear and are classified as "ultrasounds." When a sound frequency drops below about 16 cycles per second it cannot be heard and such sounds are classified as "infrasounds." Apart from the property of frequency, a sound also has intensity. The intensity of a sound is expressed in decibels, or acoustic watts, which gives a measure of the power or strength of the sound wave.

Audible and ultrasounds have been used in industry for many years. Audible sounds, for instance, have application mostly in warning and signal systems and devices. Ultrasounds have been applied to the production of emulsions, the cleaning of a wide range of articles, and the powering of various cutting and shaping devices. Infrasound, on the other hand, is a less well-known phenomenon. Infrasound has for some time been regarded as a forbidden field for research because of the dangers associated with the operation of powerful infrasound emitters. Recent scientific research on low frequency sounds has confirmed that all infrasounds are dangerous and in certain frequencies can be deadly.

Some infrasounds occur in nature. The best known are those associated with earthquakes, volcanic eruptions, and intense wind storms. Infrasounds can also occur in industry where, for instance, heavy equipment operates at low numbers of revolutions per second. Since 1950, much has been learned about the effects of infrasound on the human body. It has been proven that a frequency of seven cycles per second is fatal if sustained for even a relatively short period. It has been determined that seven cycles per second is the medium frequency of alpha brain waves in an electroencephalogram and it has been shown that even very weak intensity at this frequency can be extremely dangerous.

It has been found, however, that low frequency vibrations in the range of from about 0 to 500 cycles per second are very effective for activating reverse osmosis membranes. The low frequency sound emitter should be in close proximity to the desalination chamber though it does not have to be a part of such chamber. As the diameter of a sound wave emitter, such as a whistle reverberation chamber, is increased, the frequency of the sound produced is lowered in direct proportion to the increase in the diameter. At the same time, the intensity for acoustic output of the frequency emitter is increased by the square of the diameter. The average flat-lipped police whistle, for instance, has a chamber with a diameter of about three-quarters of an inch, and an acoustic output of about one acoustic watt. In order for the same type of device to produce a frequency of seven cycles per second, it is only necessary to increase the chamber diameter of the emitter to 286 inches. Since the intensity increases as the square of the diameter, the larger whistle will have an output of some 170 acoustical watts which is more than enough to kill any one within range.

The problem in industry is not producing low frequencies but how to protect the operator and other personnel from their dangerous effects. Infrasound-producing generators can be actuated by various means such as large loud speaker diaphragms, air jets, or mechanically operated vibrators. Inaudible infrasound waves can be detected by large microphones which provide a warning system for the operators. However, the property of the infrasound waves making them so useful in reverse osmosis applications is also the property that makes them dangerous. Shielding or absorbing infrasounds is difficult and such difficulty lies in the fact that the acoustical absorption capacity of most known shielding materials is in direct proportion to the frequency of the sound that is being absorbed. The higher the sound frequency the greater the absorption. Conversely, for infrasound, the frequency is so low that the absorption rate approaches zero and it is possible therefore for infrasounds to easily penetrate concrete walls 8 or 10 feet thick.

When infrasound waves (under 16 cycles per second) and low frequency audible sounds (under 30 cycles per second) are applied to a reverse osmosis cell used to separate fresh water from a salt water solution, the sounds easily penetrate the equipment containing the membrane. For that reason it is not necessary that the sound wave emitters be attached to or become part of the reverse osmosis equipment. As the intensity of the applied low frequency vibration increases, percussions and rarefactions are built up and results in a frictional effect at the surface of the semipermeable membrane. The precise frequency of the vibrations is not critical so long as the intensity is sufficient to produce the frictional or activation effect. When external pressure in excess of natural osmotic pressure is applied to the salt water side of a reverse osmosis cell and the cell is subjected to low frequency percussions and rarefactions, the combined effect results in an increased flow of water through the semipermeable membrane from the salt solution through the semipermeable membrane from the salt solution chamber to the fresh water chamber of the cell. Because the vibrations are of a low frequency, the membranes do not have to withstand rapid and severe destructive effects associated with high frequency vibration and cavitation.

Since shielding or absorption of low frequency sound waves present such a problem, it was necessary to investigate the possibility of a directional infrasound generator. One such device has been developed and patented in France under French Patents Nos. 131,551 and 437,460. The machine consisted of synchronized batteries of sonic emitters spaced one-quarter wave length apart and arranged in a flat plane as a square lattice with the four-corner emitters missing. This device is capable of generating a coherent beam of low frequency or infrasound which is perfectly directive and confined to a specific area. No injurious sound is emitted behind the machine. According to such French patent, by phasing several of these batteries of emitters it is possible to focus the sound beam on any desired target. Laboratory investigations of the principles set forth in the French patents involved using small electronic speakers at a frequency of 256 cycles per second proved that the same techniques could be applied to infrasonic emitters used in large scale reverse osmosis cells.

Other low and infrasound emitters investigated included a 6-foot diameter version of the Lavavassuer whistle. This type of low frequency sound generator was developed as a fog horn for ships since passengers presumably would not be disturbed by the forwardly directed sound of this unidirectional sound wave generator. The emitter constructed on this principle resembled a double version of an ordinary referee's whistle, made very flat to reduce output and conserve air flow required to operate it. This 6-foot diameter emitter produced a still audible sound frequency of about 30 cycles per second and would have required an air flow of over 10 cubic feet per second to operate it at near full power. Air was applied from a large industrial compressor powered by a 150 horsepower motor. During a short test period, this 6-foot diameter generator produced such severe vibrations in the walls of the laboratory that it was never operated near full power. The physical effects on the operator equipped with heavy protective devices over the ears were immediate and clearly noticeable. More than a day was required for the operators to recover from the after effects of this exposure.

Operation of a small reverse osmosis test cell resting directly on the framework of this Lavavassuer type low frequency sound wave emitter resulted in an increase in the flow of water to the fresh water side of a cell through a cellulose acetate membrane from a molal salt solution under a pressure of about 1,500 p.s.i. Thus, it will be seen that the vibrations can be generated by various means such as large loud speaker diaphragms, air jets, mechanically operated vibrators, or by well-known laboratory devices such as a Savart's wheel. In such a wheel pointed teeth are equally distributed on the circumference of the disk which can be rotated at various speeds to cause a contacting reed or blade to produce transverse vibrations of the desired frequency.

What is claimed is:

1. An improved reverse osmotic process for separating fresh water from salt water wherein a fresh water cell is separated from a salt water cell by a reinforced semipermeable membrane, said membrane being permeable to water but not to the dissolved salt, comprising the steps of:

(a) applying from a source external and non-attached to said fresh and salt water cells, directional low frequency vibrational energy in the range of from about 1 to about 500 cycles per second to said salt water cell and the interface between said membrane and salt water with sufficient intensity to cause turbulence and friction within the said interface, thereby minimizing the tendency of the membrane to become clogged with salt, and (b) applying pressure to said salt water cell to cause fresh water to flow through said membrane from said salt water cell to said fresh water cell, said pressure being greater than the natural osmotic pressure required to cause water to flow from said fresh water cell to said salt water cell under natural osmotic processes, whereby the rate of reverse osmotic separation of fresh water from said salt water is substantially greater than the rate of separation in the absence of said low frequency vibrational energy.

2. An improved reverse osmotic process for separating fresh water from salt water consisting of a fresh water cell separated from a salt water cell by a semipermeable membrane, said membrane being permeable to fresh water but substantially impermeable to the salt, said process comprising the steps of:

(a) applying from a source external and non-attached to said fresh and salt water cells, directional low frequency vibrational energy in the infrasound range of from about 1 to about 16 cycles per second to said salt water cell and said membrane with sufficient intensity to cause turbulence and friction at the interface of said salt water and said membrane, and (b) subjecting said salt water cell to pressure in excess of the natural osmotic pressure, thereby causing fresh water to flow from said salt water cell through said membrane to said fresh water cell at rates greater than would occur in the absence of said low frequency vibrational energy.

References Cited

UNITED STATES PATENTS

| | | | |
|---|---|---|---|
| 2,561,762 | 7/1951 | Van Tourn | 210—19 X |
| 3,206,397 | 9/1965 | Harvey | 210—22 X |
| 3,250,701 | 5/1966 | Watson et al. | 210—22 |
| 3,398,090 | 8/1968 | Bartell et al. | 210—19 |

REUBEN FRIEDMAN, Primary Examiner

F. A. SPEAR, JR., Assistant Examiner

U.S. Cl. X.R.

210—23, 321